United States Patent
Barnes

(10) Patent No.: US 10,613,865 B2
(45) Date of Patent: Apr. 7, 2020

(54) APPARATUS AND METHOD FOR CONTROLLING INSTRUCTION EXECUTION BEHAVIOUR

(71) Applicant: ARM LIMITED, Cambridge, Cambridgeshire (GB)

(72) Inventor: Graeme Peter Barnes, Cambridge (GB)

(73) Assignee: ARM Limited, Cambridge (GB)

(*) Notice: Subject to any disclaimer, the term of this patent is extended or adjusted under 35 U.S.C. 154(b) by 13 days.

(21) Appl. No.: 15/749,806

(22) PCT Filed: Jul. 21, 2016

(86) PCT No.: PCT/GB2016/052205
§ 371 (c)(1),
(2) Date: Feb. 2, 2018

(87) PCT Pub. No.: WO2017/032969
PCT Pub. Date: Mar. 2, 2017

(65) Prior Publication Data
US 2018/0225120 A1    Aug. 9, 2018

(30) Foreign Application Priority Data
Aug. 27, 2015  (GB) .................................. 1515256.4

(51) Int. Cl.
*G06F 9/30* (2018.01)
*G06F 9/46* (2006.01)
(Continued)

(52) U.S. Cl.
CPC ........ *G06F 9/30181* (2013.01); *G06F 9/3004* (2013.01); *G06F 9/30036* (2013.01);
(Continued)

(58) Field of Classification Search
None
See application file for complete search history.

(56) References Cited

U.S. PATENT DOCUMENTS

| 3,573,855 A | 4/1971 | Cragon et al. |
| 6,185,673 B1 * | 2/2001 | Dewan ................ G06F 9/30101 |
| | | 712/223 |

(Continued)

OTHER PUBLICATIONS

R.N.M. Watson et al, "Capability Hardware Enhanced RISC Instructions: CHERI Instruction-set architecture" Technical Report No. 850, UCAM-CL-TR-850, ISSN 1476-2986, University of Cambridge Computer Laboratory, Apr. 2014, 131 pages.

(Continued)

*Primary Examiner* — Corey S Faherty
(74) *Attorney, Agent, or Firm* — Nixon & Vanderhye P.C.

(57) ABSTRACT

An apparatus and method are provided for controlling instruction execution behaviour. The apparatus includes a set of data registers for storing data values, and a set of bounded pointer storage elements, where each bounded pointer storage element stores a pointer having associated range information indicative of an allowable range of addresses when using that pointer. A control storage element stores a current instruction context, and that current instruction context is used to influence the behaviour of at least one instruction executed by processing circuitry, that at least one instruction specifying a pointer reference for a required pointer, where the pointer reference is within at least a first subset of values (in one embodiment the behaviour is influenced irrespective of the value of the required pointer). In particular, when the current instruction context identifies a default state, the processing circuitry uses the pointer reference to identify one of the data registers whose stored data value forms the required pointer. However, when the current instruction context identifies a bounded pointer state, (Continued)

the processing circuitry instead uses the pointer reference to identify one of the bounded pointer storage elements whose stored pointer forms the required pointer. This allows an instruction set to be provided that can be used for both bounded pointer aware code and bounded pointer unaware code, without significantly increasing the pressure on instruction set encoding space.

25 Claims, 12 Drawing Sheets

(51) Int. Cl.
    *G06F 21/52* (2013.01)
    *G06F 9/32* (2018.01)
    *G06F 9/34* (2018.01)
    *G06F 9/38* (2018.01)

(52) U.S. Cl.
    CPC ...... *G06F 9/30043* (2013.01); *G06F 9/30054* (2013.01); *G06F 9/30101* (2013.01); *G06F 9/30189* (2013.01); *G06F 9/321* (2013.01); *G06F 9/322* (2013.01); *G06F 9/34* (2013.01); *G06F 9/3857* (2013.01); *G06F 9/462* (2013.01); *G06F 21/52* (2013.01)

(56) References Cited

U.S. PATENT DOCUMENTS

| | | | |
|---|---|---|---|
| 7,062,761 B2* | 6/2006 | Slavin | G06F 8/31 |
| | | | 717/151 |
| 2008/0184016 A1 | 7/2008 | Erlingsson et al. | |
| 2011/0078389 A1 | 3/2011 | Patel et al. | |
| 2014/0365742 A1 | 12/2014 | Patel et al. | |
| 2015/0227414 A1* | 8/2015 | Varma | G06F 11/073 |
| | | | 714/47.1 |

OTHER PUBLICATIONS

International Search Report and Written Opinion of the ISA for PCT/GB2016/052205, dated Sep. 30, 2016.
Combined Search and Examination Report for GB1515256.4, dated Mar. 11, 2016, 5 pages.

* cited by examiner

A)  SET   PR1 = 140000 → trigger error

B)  SET   PR1 = 140000
    LD    R5, PR1 → trigger error ium phase of International
APPARATUS AND METHOD FOR CONTROLLING INSTRUCTION EXECUTION BEHAVIOUR This application is the U.S. national phase of International Application No. PCT/GB2016/052205 filed 21 Jul. 2016, which designated the U.S. and claims priority to GB Patent Application No. 1515256.4 filed 27 Aug. 2015, the entire contents of each of which are hereby incorporated by reference.

The present technique relates to the field of data processing.

When executing instructions, it is known to execute certain instructions that use pointers to identify addresses in memory. Examples of such instructions are load and store instructions used to load data from an address in memory into a register, or to store a data value from a register to an address in memory. Such load and store instructions can be encoded such that they identify a register within a set of general purpose registers that contains the pointer value to be used to determine the memory address.

However, some data processing apparatuses may support the use of bounded pointers where a pointer indicating a particular address is associated with range information indicating an allowable range of addresses for the pointer. For example, such pointers may be referred to as "fat pointers". A set of bounded pointer storage elements may be provided for the storage of such bounded pointers. It would be useful to provide within an instruction set instructions that can operate using such bounded pointers, whilst also supporting the ability to execute instructions that instead use a data value in a general purpose register to provide a pointer.

In one example configuration, there is provided an apparatus, comprising: a set of bounded pointer storage elements, each bounded pointer storage element to store a pointer having associated range information indicative of an allowable range of addresses when using said pointer; a set of data registers to store data values; processing circuitry to execute a sequence of instructions; and a control storage element to store a current instruction context; the processing circuitry being responsive to execution of at least one instruction in said sequence that specifies a pointer reference for a required pointer, where the pointer reference is within at least a first subset of values:—to use the pointer reference to identify one of the data registers whose stored data value forms the required pointer, when the current instruction context identifies a default state; —to use the pointer reference to identify one of the bounded pointer storage elements whose stored pointer forms the required pointer, when the current instruction context identifies a bounded pointer state.

In another example configuration, there is provided a method of controlling instruction execution behaviour within an apparatus having a set of bounded pointer storage elements, each bounded pointer storage element for storing a pointer having associated range information indicative of an allowable range of addresses when using said pointer, and having a set of data registers for storing data values, the method comprising: storing within a control storage element a current instruction context; on executing at least one instruction that specifies a pointer reference for a required pointer, where the pointer reference is within at least a first subset of values:—using the pointer reference to identify one of the data registers whose stored data value forms the required pointer, when the current instruction context identifies a default state; using the pointer reference to identify one of the bounded pointer storage elements whose stored pointer forms the required pointer, when the current instruction context identifies a bounded pointer state.

In a yet further example configuration, there is provided an apparatus, comprising: a set of bounded pointer storage means, each bounded pointer storage means for storing a pointer having associated range information indicative of an allowable range of addresses when using said pointer; a set of data register means for storing data values; processing means for executing a sequence of instructions; and a control storage means for storing a current instruction context; the processing means, responsive to execution of at least one instruction in said sequence that specifies a pointer reference for a required pointer, where the pointer reference is within at least a first subset of values: —for using the pointer reference to identify one of the data register means whose stored data value forms the required pointer, when the current instruction context identifies a default state; —for using the pointer reference to identify one of the bounded pointer storage means whose stored pointer forms the required pointer, when the current instruction context identifies a bounded pointer state.

The present technique will be described further, by way of example only, with reference to embodiments thereof as illustrated in the accompanying drawings, in which.

Figure 3:
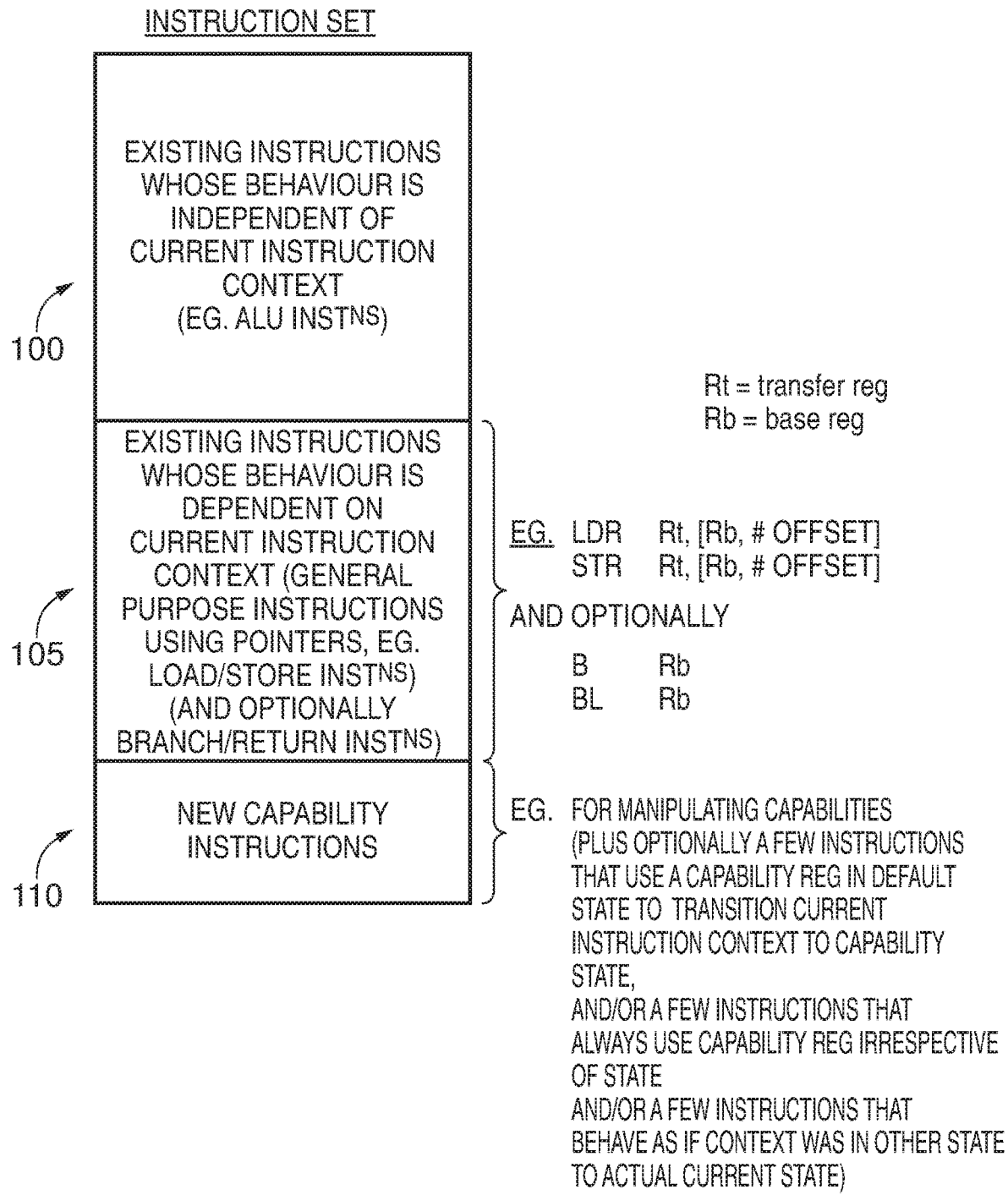
Figure 4A:
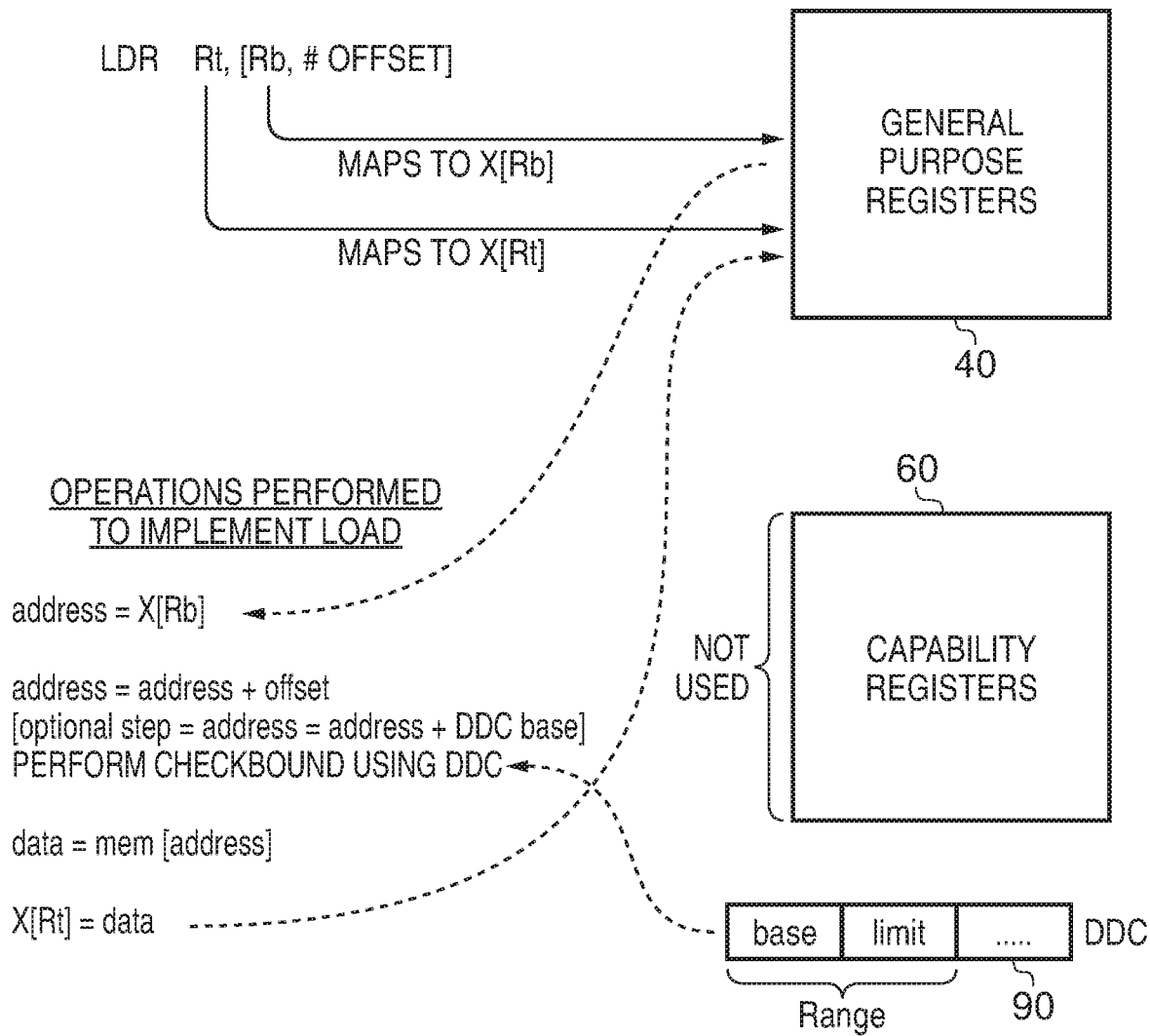
Figure 4B:
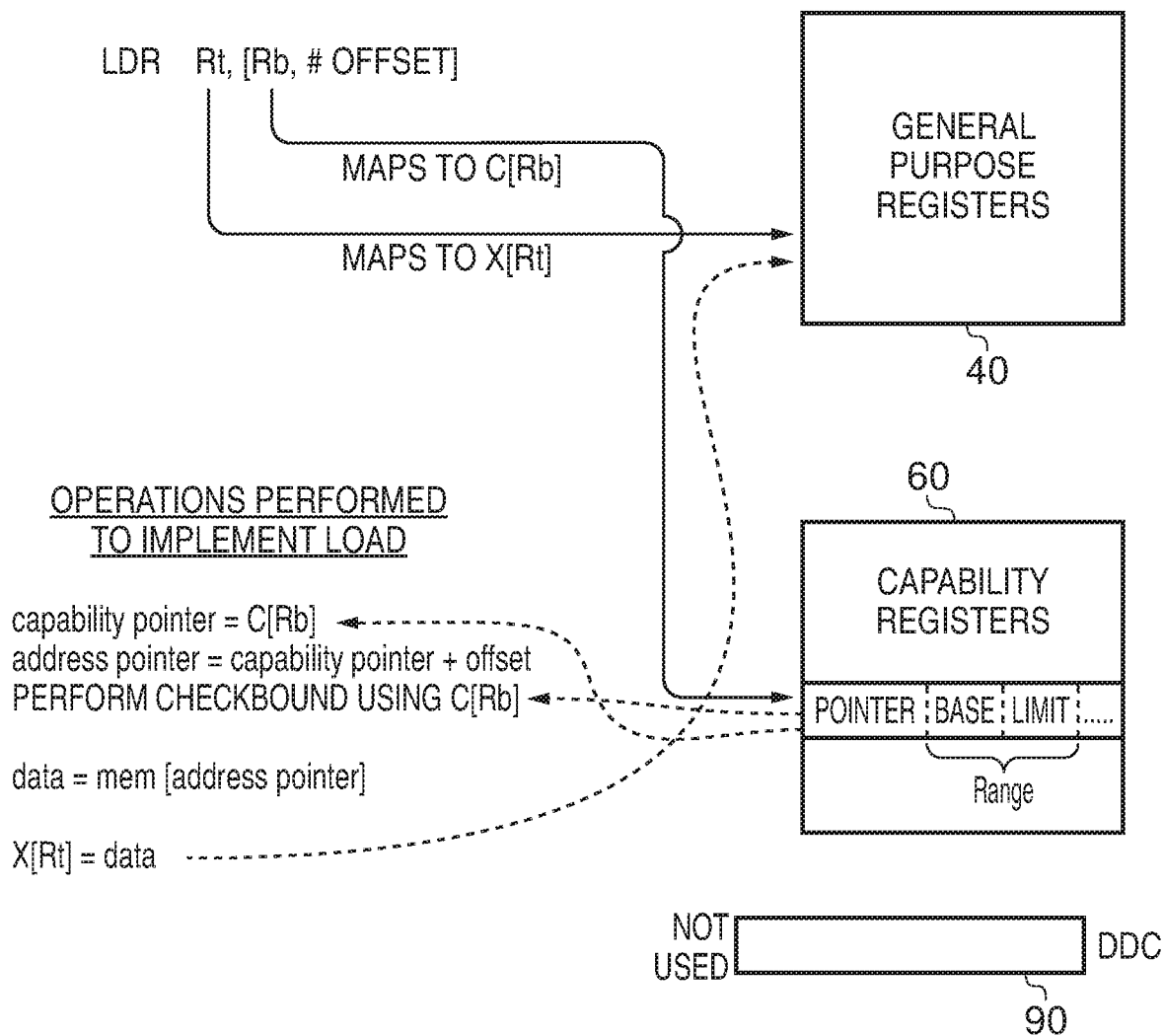
Figure 5:
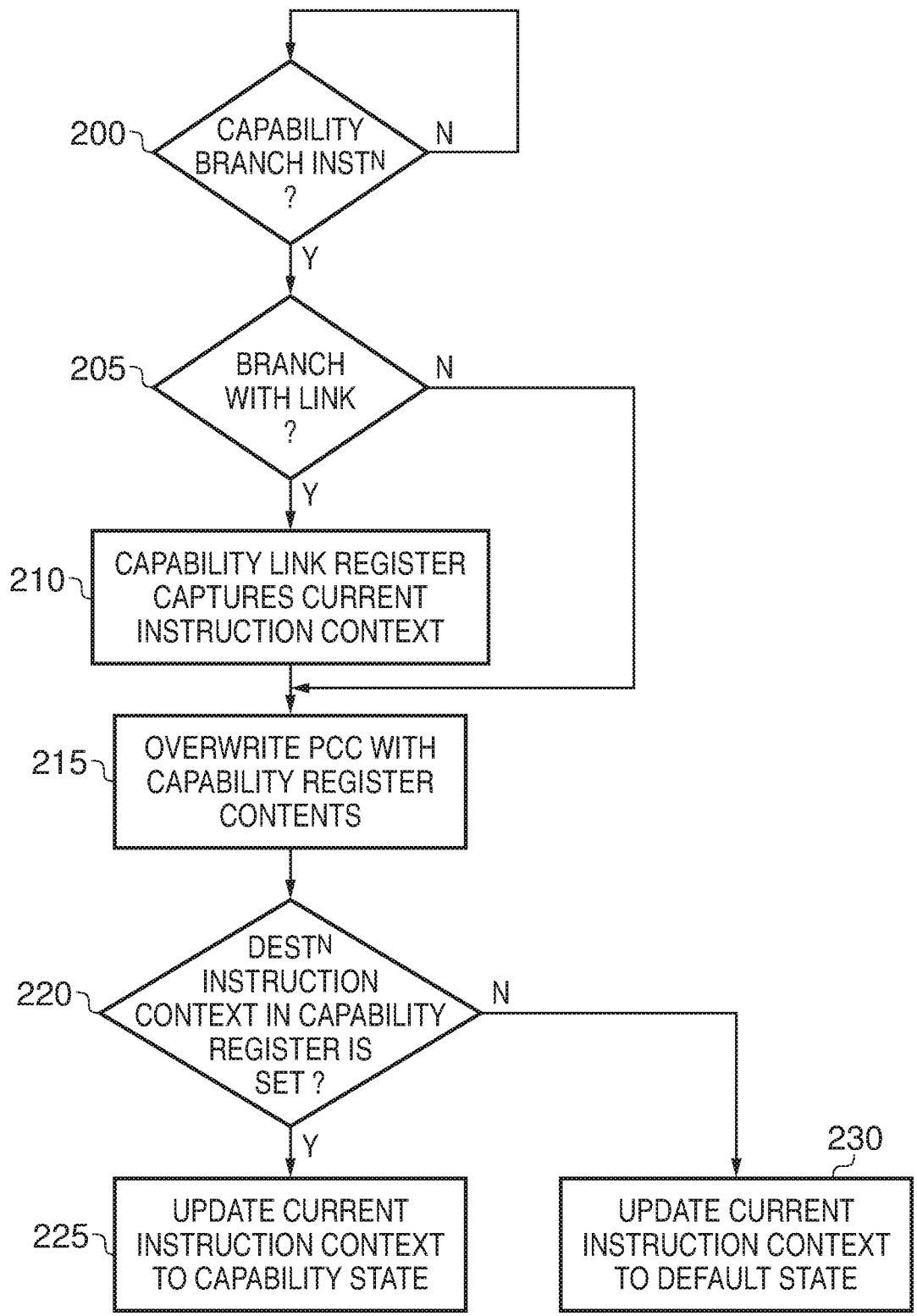
Figure 6A:
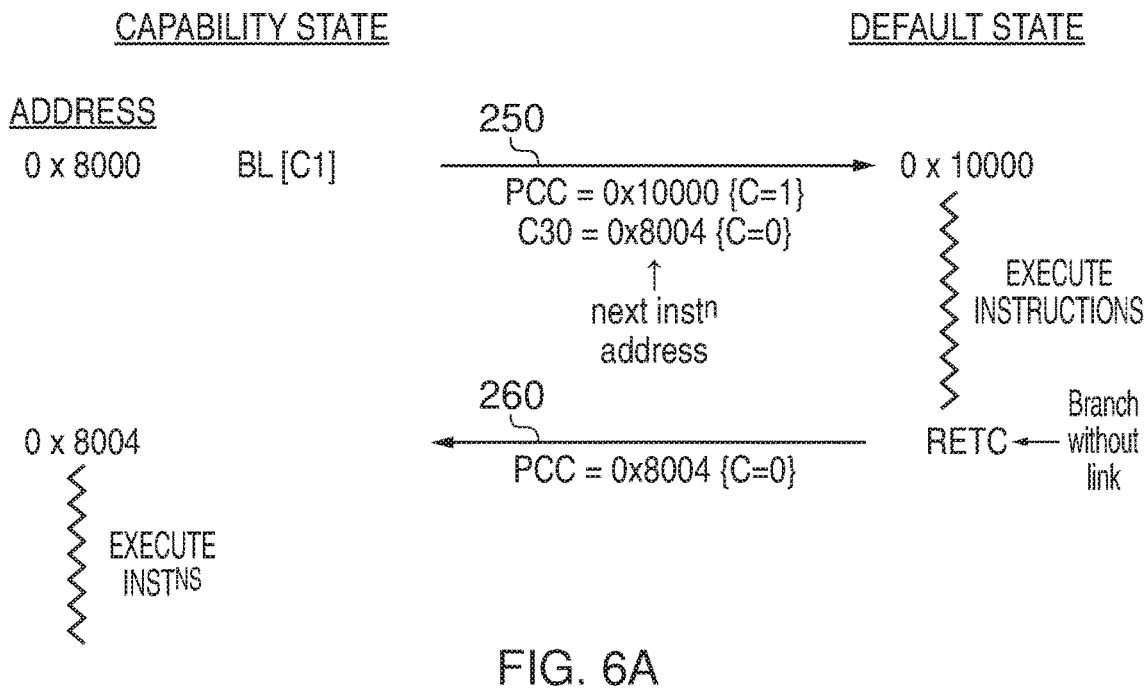
Figure 6B:
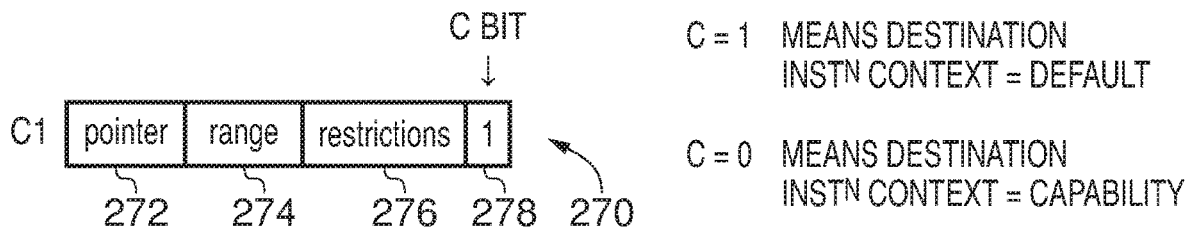
Figure 7:
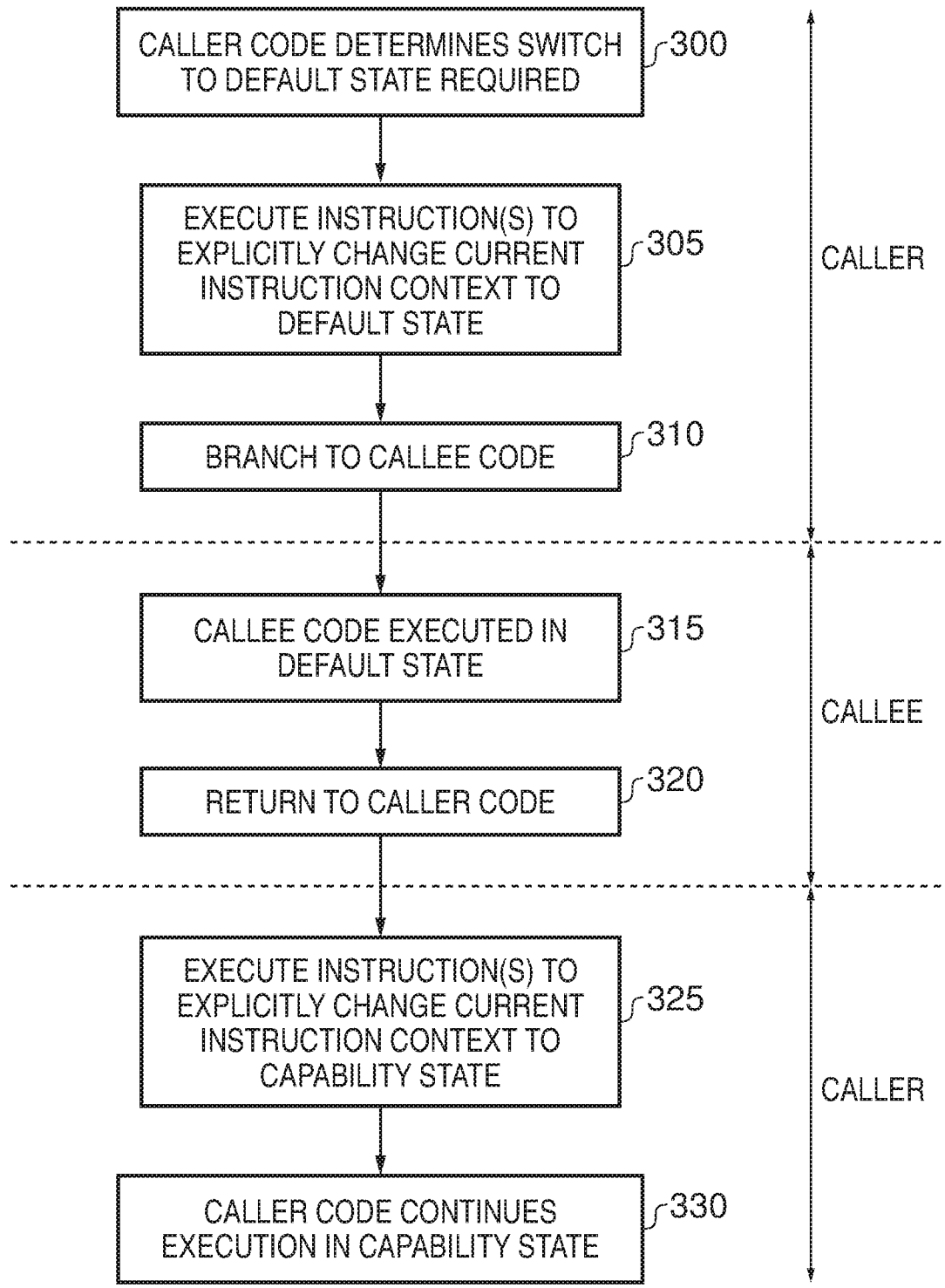
Figure 8:
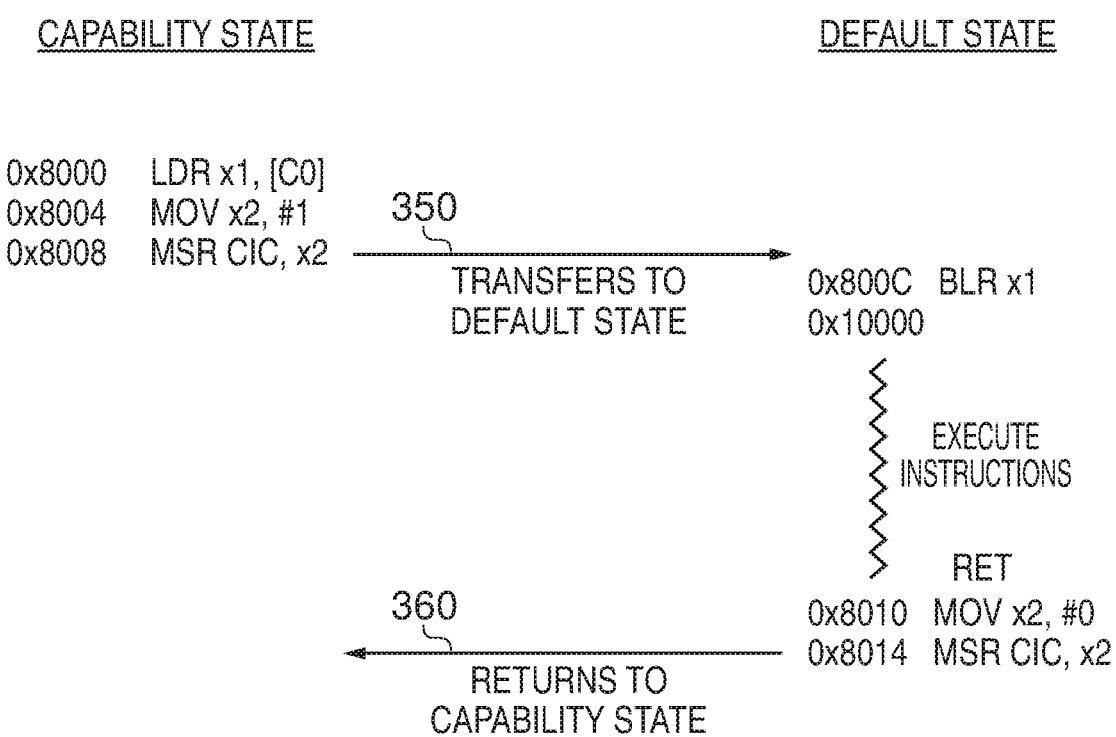
Figure 9:
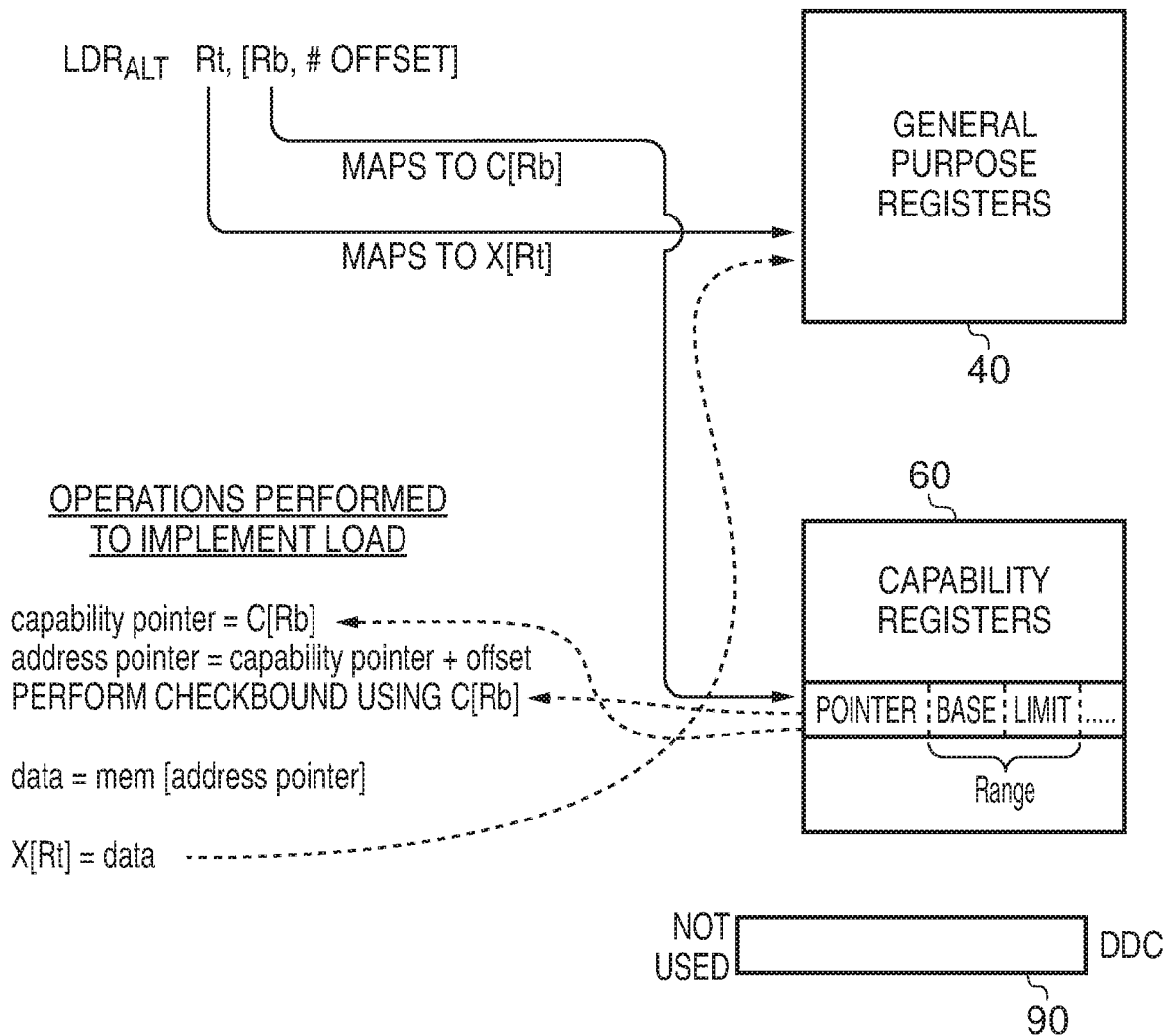
Figure 10A:
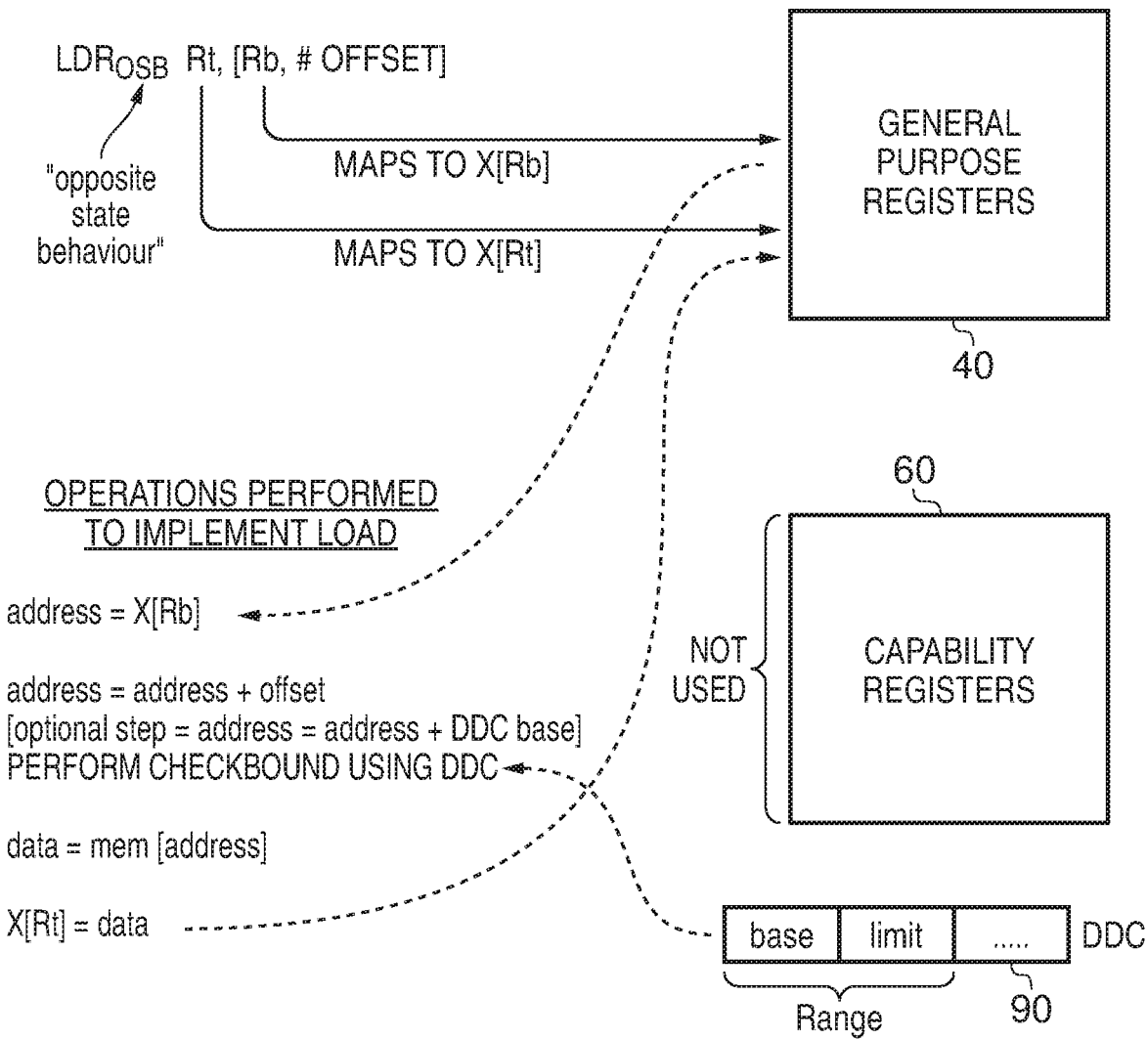
Figure 10B:
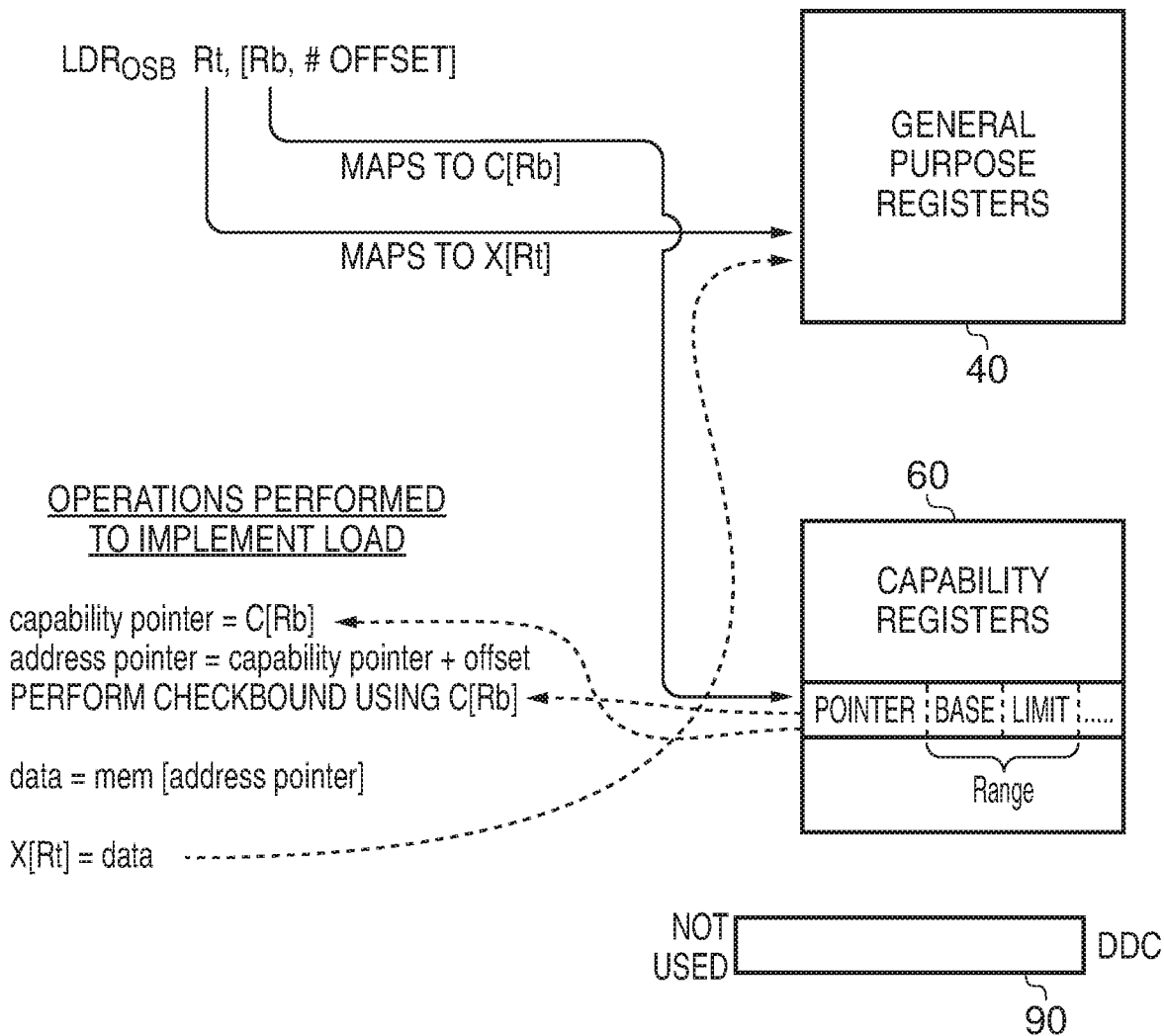

FIG. 3 schematically illustrates different types of instructions that may be provided within an instruction set in accordance with one embodiment;

FIGS. 4A and 4B illustrate how the behaviour of a load instruction is altered dependent on the current instruction context, in accordance with one embodiment;

FIG. 5 is a flow diagram illustrating a process that may be performed to switch between different instruction context states in accordance with one embodiment;

FIGS. 6A and 6B are diagrams illustrating how a branch instruction may be used to transition between capability state and default state in accordance with one embodiment;

FIG. 7 is a flow diagram illustrating a mechanism for switching between instruction context states in accordance with an alternative embodiment;

FIG. 8 is a diagram providing one specific example of a technique using the method of FIG. 7;

FIG. 9 illustrates a further load instruction that may be provided in one embodiment, that always obtains a pointer from a capability register irrespective of the current instruction context; and FIGS. 10A and 10B illustrate opposite state behaviour instructions that may be provided in accordance with one embodiment.

Before discussing the embodiments with reference to the accompanying figures, the following description of embodiments is provided.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such architecture. Alternatively, there may be some non-capability based architectures which allow bounded pointers to be defined.

Hence, an apparatus may have at least one bounded pointer storage element which stores a pointer having associated range information indicative of an allowable range of addresses when using the pointer. Each bounded pointer storage element could be a register, or location on a stack memory for example.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

However, it is also desirable to provide instructions that do not reference such a bounded pointer, but instead obtain their pointers in a default manner, for example with reference to a data value stored in a general purpose register. Considering the earlier example of capability-based architectures, this would hence enable the instruction set to be used to execute capability unaware code (where pointers are derived from data values in general purpose registers for example), whilst also supporting execution of capability aware code, where the pointers are derived from the contents of the earlier-mentioned bounded pointer storage elements. However, in modern processing systems there is a significant pressure on instruction set space, which significantly limits the number of instructions that can be specified within the instruction set.

In one embodiment, an apparatus is provided that has a set of bounded pointer storage elements, each bounded pointer storage element being used to store a pointer having associated range information indicative of an allowable range of addresses when using that pointer, and which also includes a set of data registers to store data values. A control storage element is also provided that stores a current instruction context. Processing circuitry is used to execute a sequence of instructions, and is responsive to execution of at least one instruction in the sequence that specifies a pointer reference for a required pointer, where the pointer reference is within at least a first subset of values, to alter the execution behaviour of that instruction dependent on the current instruction context. In particular, when the current instruction context identifies the default state, the processing circuitry uses the pointer reference specified by the instruction to identify one of the data registers whose stored data value forms the required pointer. However, if the current instruction context instead identifies a bounded pointer state, the processing circuitry uses the pointer reference to identify one of the bounded pointer storage elements whose stored pointer forms the required pointer. Hence, by such an approach, the same instruction can be arranged to behave differently dependent on the current instruction context, and in particular the way in which the pointer reference is used to identify the required pointer is dependent on the current instruction context. By such an approach, this can enable the same instruction set to be used for both capability unaware code and capability aware code, whilst taking into account the pressure on instruction set space mentioned earlier.

In one embodiment, the above behaviour can be adopted irrespective of the value of the pointer reference. Hence, whenever the current instruction context identifies the default state, a data register will be identified from the pointer reference specified by the instruction, whereas whenever the current instruction context identifies the bounded pointer state, a bounded pointer storage element will be identified from the pointer reference specified by the instruction.

However, in an alternative embodiment, the above behaviour can be limited to particular ranges of values of the pointer reference. Hence, by way of example, if the pointer reference is within a second subset of values different to the first subset, then the processing circuitry may be arranged to identify a data register from the pointer reference irrespective of whether the current instruction context identifies the default state or the bounded pointer state. This could for example be beneficial when the number of possible values of the pointer reference exceeds the number of bounded pointer storage elements provided by a particular implementation. Considering purely by way of example a situation where a 5 bit field is used to specify a pointer reference, allowing 32 different values to be specified (e.g. values 0 to 31), there may be 32 data registers, but less than 32 bounded pointer storage elements. If there were for example 16 bounded pointer storage elements, the apparatus could be arranged so that when the pointer reference has a value between 0 and 15, the above described behaviour is performed in order to selectively choose between a data register and a bounded pointer storage element dependent on the current instruction context, whereas if the pointer reference has a value between 16 and 31, it is always mapped to a data register irrespective of the current instruction context.

In a further alternative embodiment, current instruction context values could be specified for particular ranges of pointer reference value. Hence, the earlier mentioned current instruction context could be used when the pointer reference has a value within the first subset of values, whilst one or more further current instruction contexts could be specified, each associated with a further different range of values for the pointer reference. This would enable a finer granularity as to how the above described behaviour is applied for particular values of the pointer reference, controlling whether particular pointer reference values are mapped to data registers or bounded pointer storage elements, dependent on the current instruction context applicable for those particular pointer reference values.

In one embodiment, when executing one of the above-mentioned instructions that specifies a pointer reference for a required pointer, the processing circuitry is further arranged to determine an address from the required pointer and, when the current instruction context identifies the bounded pointer state, to then perform a bound check operation to check that the determined address is within the allowable range of addresses indicated by the associated range information for the relevant bounded pointer storage element. Hence, this enables security or functional correctness of behaviour to be maintained when executing such an instruction, in situations where the current instruction context identifies the bounded pointer state.

In one embodiment, when the current instruction context identifies the default state, the apparatus may be arranged to operate so that no bound check operation is performed, and hence when the instruction is executed the processing circuitry is allowed to access the address that it derives from the pointer obtained from the data register, subject to any existing security measures in place within the apparatus. However, in an alternative embodiment, when the current instruction context identifies the default state, the processing circuitry may be arranged to perform a default bound check operation to check that the determined address is within a default allowable range of addresses.

There are a number of ways in which such a default range may be specified, but in one embodiment the apparatus further comprises a default range storage element to store range information indicative of the default allowable range. Within a capability-aware system, this would for example allow the system to, when desired, switch to execution of capability unaware code, for example from an existing software library, with that existing capability unaware code being run in the default state and constrained to access a default range of addresses that could be set by the capability aware system, thereby allowing the capability aware system to control the range of addresses that the capability unaware code can access.

In one embodiment, when performing the bound check operation (whether in the bounded pointer state or when performing the default bound check operation in the default state), the processing circuitry may be arranged to take into account a size of data value being accessed at the determined address, in order to ensure that all of the data value is within the allowable range of addresses. This hence ensures that no part of the date value being accessed lies outside of the allowable range.

Whilst at any point in time it will typically be the case that the apparatus is either executing bounded pointer aware code that utilises the set of bounded pointer storage elements when pointers are required, or bounded pointer unaware code that uses the standard data registers when determining the pointers required, it would be useful to provide a mechanism for switching between these two different types of code on a fairly fine grained basis. In one embodiment, this is achieved by arranging the processing circuitry to be responsive to at least one further instruction to update the current instruction context stored in the control storage element, hence allowing execution of that instruction to switch the current instruction context between the bounded pointer state and the default state in either direction.

There are a number of ways in which such an instruction can be defined to update the current instruction context. In one embodiment, at least one of the bounded pointer storage elements is arranged to include a destination instruction context field specifying an instruction context value. Then, an instruction which is used to update the current instruction context can be arranged to reference one such bounded pointer storage element in order to obtain the instruction context value from the destination instruction context field, and to use that obtained value in order to update the current instruction context stored within the control storage element.

In one particular example, the instruction executed by the processing circuitry for this purpose is a branch instruction that specifies one of the bounded pointer storage elements that includes such a destination instruction context field. The processing circuitry is then responsive to executing that branch instruction to update the current instruction context by storing in the control storage element the instruction context value obtained from the specified bounded pointer storage element.

This provides a particularly efficient implementation, since it will typically be the case that a branch instruction will need to be executed in any event in order to transition between code that is bounded pointer aware and code that is not bounded pointer aware, and in this embodiment the actual update of the current instruction context can be incorporated within the sequence of steps performed to execute the branch instruction.

Instructions will typically be fetched from memory using a program counter value/pointer, and during a branch operation that program counter value can be updated in order to point to the address of the first instruction in the code being branched to. In one embodiment, the apparatus further comprises a bounded program counter storage element that stores a program counter pointer having associated range information indicative of an allowable range of program counters determined from the program counter pointer. Hence, this enables bound checks to be performed to ensure that the instructions being fetched are from addresses that are allowed having regard to the contents of the bounded program counter storage element.

In one such embodiment, the processing circuitry is additionally responsive to execution of the branch instruction to update the bounded program counter storage element using the pointer and associated range information obtained from the bounded pointer storage element specified by that branch instruction. This provides an efficient mechanism for updating the program counter range information appropriate for target code being branched to via execution of the branch instruction.

In one embodiment, the above type of branch instruction that employs a bounded pointer storage element may be executed by the processing circuitry in both the default state and the bounded pointer state, in order to allow a switch between the default state and the bounded pointer state in either direction. Hence, the behaviour of such a branch instruction is independent of the current instruction context, and hence will operate in the same manner, in particular referencing the specified bounded pointer storage element irrespective of whether the current instruction context is the default state or the bounded pointer state.

In one embodiment, the set of bounded pointer storage elements may include a bounded link storage element whose pointer is used to identify a return address, such a bounded link storage element further identifying a return instruction context. As a result, when an operation is performed to branch from current code to some target code, the bounded link storage element can be updated with the return address for the current code and also with the instruction context applicable to that current code, so that when execution is switched to the target code, the bounded link storage element provides information about where to return to once the target code has been executed.

The earlier mentioned type of branch instruction that references a bounded pointer storage element can then be used to perform a return operation back to the original code, by causing that branch instruction to specify the above-mentioned bounded link storage element. In particular, when the branch instruction is then executed, this causes the processing circuitry to return to an instruction address specified by the return address in the bounded link storage element, and to update the current instruction context by storing in control storage element the return instruction context identified in the bounded link storage element. This can then enable execution of the original code to be resumed at the appropriate address, and with the correct instruction context applicable to that code.

Whilst in the above-mentioned examples, a branch instruction can be supplemented with the required functionality to update the current instruction context, in an alternative embodiment a different update instruction may be provided whose execution causes an update value specified by the update instruction to be written into the control storage element in order to update the current instruction context.

By such an approach, it is no longer necessary for destination instruction context information to be included within the contents of the bounded pointer storage elements, but does require the execution of additional instructions, since the branch instruction itself will not update the current instruction context.

The update instruction can be arranged in a variety of ways to specify the relevant update value. In one embodiment, the update instruction may identify one of the data registers whose stored data value is used to update the current instruction context. Alternatively, the update instruction may specify an immediate value that is directly used to update the current instruction context without needing to reference any of the data registers.

The earlier mentioned instructions that specify a pointer reference for a required pointer, and whose behaviour is altered dependent on the current instruction context, can take a variety of forms, but in one embodiment such instructions comprise at least some of the load and store instructions provided within an instruction set. In addition, if desired, other instructions that specify a pointer reference can also have their behaviour modified dependent on the current instruction context. For example, one or more of the branch instructions specified by the instruction set may also be arranged to have their behaviour modified dependent on the current instruction context if desired.

The instruction set containing such instructions can take a variety of forms. In one embodiment, the instruction set comprises a first subset of instructions whose execution behaviour is independent of the current instruction context, and a second subset of instructions whose execution behaviour is dependent on the current instruction context. The second subset will typically include at least some of the instructions that specify pointer references, for example the earlier mentioned load and store instructions.

In addition, the instruction set can also include one or more further instructions to provide additional desired functionality within an apparatus where the second subset of instructions have execution behaviour that is dependent on the current instruction context.

For instance, in one embodiment the instruction set may include at least one additional instruction that specifies a pointer reference for a required pointer, wherein when executing said at least one additional instruction, the processing circuitry is arranged to use the pointer reference to identify one of the bounded pointer storage elements whose stored pointer forms the required pointer, irrespective of whether the current instruction context identifies the bounded pointer state or the default state. One example of such an instruction is the earlier-mentioned branch instruction that references one of the bounded pointer storage elements, and that can be executed irrespective of the current instruction context.

A further example of an additional instruction that could be added is an opposite state behaviour instruction that specifies a pointer reference for a required pointer, wherein when executing said at least one opposite state behaviour instruction, the processing circuitry is arranged to use the pointer reference to identify one of the data registers whose stored data value forms the required pointer when the current instruction context identifies the bounded pointer state, and to use the pointer reference to identify one of the bounded pointer storage elements whose stored pointer forms the required pointer when the current instruction context identifies the default state. The provision of such an opposite state behaviour instruction can permit efficient interwork between bounded pointer aware code and bounded pointer unaware code.

The bounded pointer storage elements can take a variety of forms, but in one embodiment comprise a set of bounded pointer storage registers. Further, the bounded pointer storage elements may be arranged to directly store the associated range information in addition to the pointer, or alternatively a further storage element may be provided to store the associated range information for the pointer stored in a corresponding bounded pointer storage element.

There are a number of ways in which the range information can be specified, in one embodiment the range information identifying a lower bound and an upper bound for the allowable range of addresses, whilst in an alternative embodiment the range information identifying one of the lower bound and an upper bound, along with size information used to identify the allowable range of addresses.

Particular embodiments will now be described with reference to the Figures.

Figure 1:
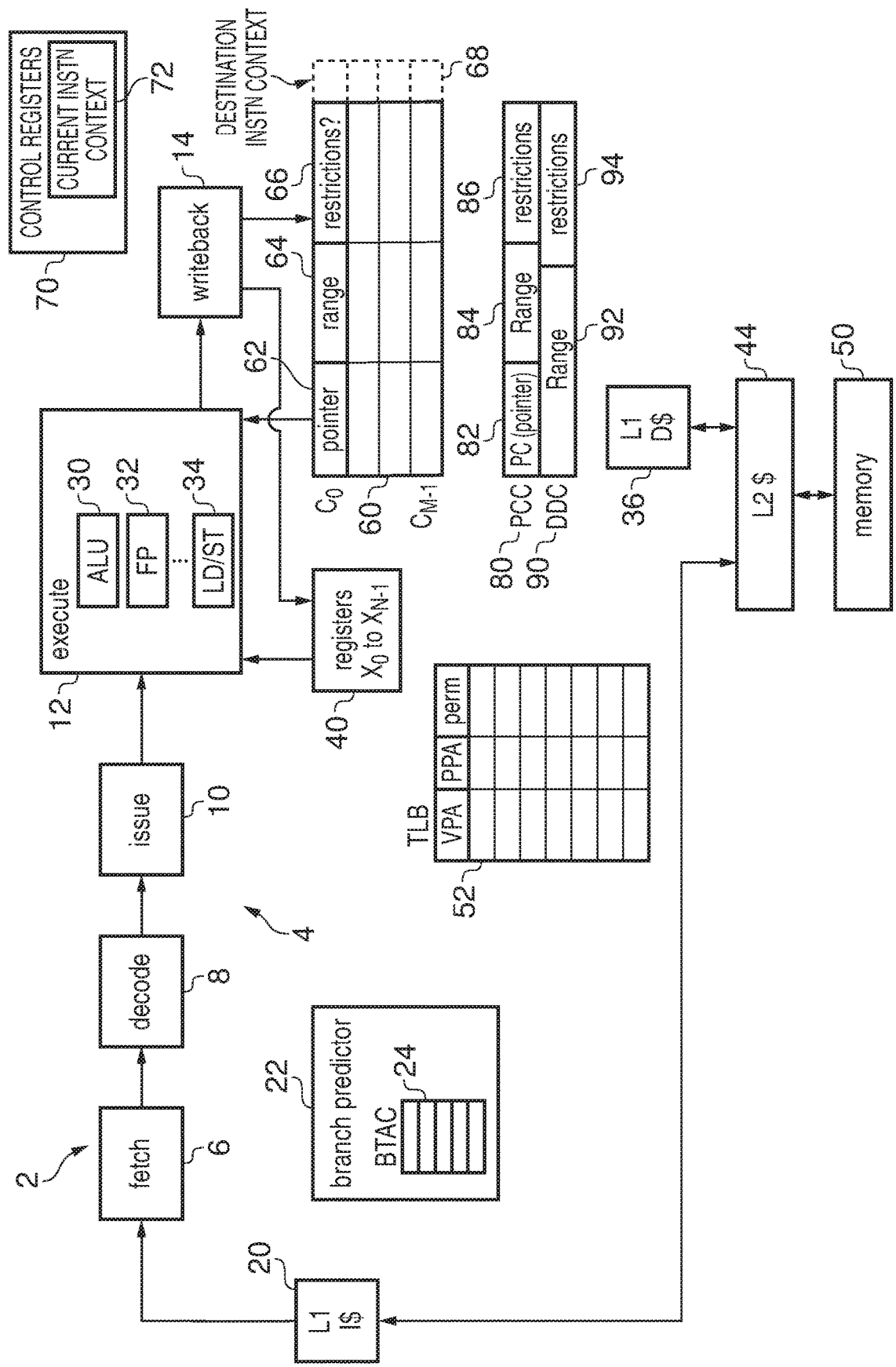
FIG. 1 is a block diagram of an apparatus in accordance with one embodiment.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. Optionally, the bounded register 60 may also include other restriction information 66 which may define one or more restrictions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
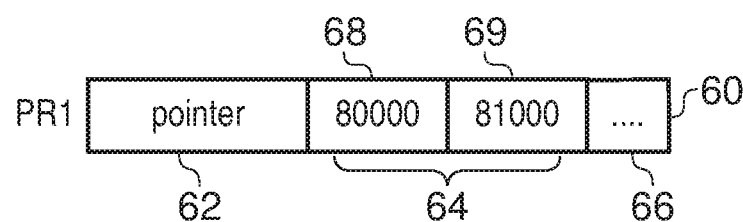
FIG. 2 shows examples of types of instruction for which an error is triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

In one embodiment, the instruction set used by the apparatus 2 is used to write application programs that are bounded pointer aware (also referred to herein as capability aware), and hence make use of the bounded pointer storage elements 60 when using pointers to specify memory addresses, and additionally to write application programs that are bounded-pointer unaware (also referred to herein as capability unaware), where data values within the general purpose registers 40 may be used to specify pointer values. In one embodiment, within the various control registers 70 used to control the operation of the apparatus, a current instruction context control register 72 is provided, and the behaviour of certain instructions executed by the apparatus is modified dependent on the current state indicated by the current instruction context register.

In particular, as illustrated schematically in FIG. 3, the instruction set may include a first subset 100 of instructions whose behaviour is independent of the current instruction context. Examples would be certain arithmetic logic instructions executed within the ALU, or indeed floating point instructions executed within the FPU 32. However, in addition, a second subset 105 of the instructions have their behaviour modified dependent on the current instruction context. Within the second subset there will typically be at least some of the general purpose instructions that use pointers, for example at least a subset of the load and/or store instructions specified by the instruction set. As shown in FIG. 3, such load or store instructions usually specify a base register Rb whose contents are used to identify a pointer, and a transfer register Rt forming a destination register for a load operation (i.e. the register into which the loaded data value is stored), or a source register for a store operation (i.e. the register storing the source data to be stored out to memory). In accordance with one embodiment, whilst the transfer register may always be mapped to one of the general purpose registers in the set 40, the way in which the specified base register is mapped will vary dependent on the current instruction context. In particular, if the current instruction context indicates a default state, the base register will be mapped to one of the general purpose registers 40. However, if the current instruction context indicates a capability state, then the base register is instead mapped to one of the capability registers 60. Hence, it will be appreciated that the source of the pointer information used by the load or store instruction is dependent on the current instruction context stored within the current instruction context register 72.

In addition to certain load or store instructions, the second subset 105 may also include one or more other instructions that reference pointers. For example, if desired one or more of the branch instructions specified by the instruction set may also be included within the second subset 105, so that their behaviour is dependent on the current instruction context. In particular, dependent on the current instruction context, this would dictate whether the base register required for the branch instruction is obtained from one of the capability registers 60, or from one of the general purpose registers 40. Such an approach could also be used to determine whether a data link register or a capability link register is used to capture the return address information (along with a return instruction context if a capability link register is used).

As will be discussed in more detail later, the instruction set may also include a number of additional instructions 110 that provide additional functionality to generally support a system where the behaviour of the second subset 105 of instructions is dependent on the current instruction context. For example, there may be one or more instructions specified that use a capability register in the default state, in order to transition the current instruction context to the capability state. There can also be one or more further instructions that always use a capability register irrespective of the state, and indeed one or more instructions that behave as if the current instruction context is in the other state to the state that is actually indicated by the current instruction context register 72.

As mentioned earlier, when the current instruction context indicates the default state, then for any instructions in the second subset 105, a base register used to specify a pointer will be mapped to one of the general purpose registers 40, and the data value in that general purpose register will then be used as the pointer. This in principle will allow the code executing such an instruction to access any address in memory, subject to any other security measures that are put in place within the apparatus.

However, in one embodiment, to further limit accesses that may be made in the default state, a Default Data Capability (DDC) register 90 may be provided that specifies both range information 92 and any restriction data 94, similar to the range and restriction information included within any of the capability registers. Then, when an instruction in the second subset 105 is executed in the default state, and hence obtains its pointer from one of the general purpose registers 40, a bound check operation is performed based on any address derived from that pointer, having regards to the range and restriction information held within the DDC register 90. By such an approach, it is possible for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

FIGS. 4A and 4B illustrate how a load instruction, forming one of the instructions in the second subset 105 of the instruction set, has its execution behaviour modified dependent on the current instruction context. In particular, FIG. 4A illustrates the situation where the current instruction context indicates the default state. Accordingly, not only the transfer register specifier, but also the base register specifier, are mapped to the general purpose registers 40. As hence illustrated in FIG. 4A, the initial address is obtained by accessing one of the general purpose registers (also referred to herein as the X registers), with the choice of that general purpose register being dependent on the base register specifier in the load instruction. In this example, an offset is then added to the initial address in order to identify an updated address that is actually used as the load address. Thereafter, a check bound operation is performed using the DDC register 90 contents, with that operation being illustrated towards the bottom of FIG. 4A. In one embodiment, the check bound operation may operate on the calculated address (including the offset) directly, whilst in an alternative embodiment, the address may be modified prior to performing the check bound operation, by adding the DDC base address, the DDC base address being one of the addresses provided within the range information within the DDC register 90.

The check bound operation will take account of the address, and the size of data being accessed by the load instruction, and will determine whether the address is less than the DDC base address, or whether the address with the size information added exceeds the DDC limit address, the DDC limit address identifying the other bound of the range within the DDC register 90. If either of these conditions is present, then the load is aborted. Otherwise, the data is obtained by performing a memory access to the specified address, with the returned data then being stored within the destination register X[Rt] within the general purpose registers 40, as determined from the transfer register specifier within the load instruction. Accordingly, it will be apparent from the description of FIG. 4A that the capability registers 60 are not used when processing the load instruction within the load/store unit 34 in the default state.

However, as shown in FIG. 4B, if the current instruction context is the capability state, then those capability registers are used. In particular, whilst the transfer register specifier continues to be mapped to one of the general purpose registers, the base register specifier is mapped to one of the capability registers, since that base register specifier is used to access a pointer. Hence, a capability pointer is obtained from one of the capability registers (herein referred to as a C register), with the capability register being determined based on the base register specifier Rb. An address pointer is then determined by adding the offset to the capability pointer, whereafter a check bound operation is performed using the information in the identified capability register. In particular, as shown at the bottom of FIG. 4B, it is determined whether the address pointer is less than the capability base value, or whether the address pointer in combination with the data size information is greater than the capability limit information. If so, then the load is aborted. Otherwise, the data is obtained from the memory address given by the address pointer, and stored within the destination register X[Rt].

In one embodiment, store instructions are handled in a similar manner, with the transfer register being used to identify the data that needs to be stored out to memory at the determined memory address.

The above approach provides a very efficient mechanism for supporting both capability aware code and capability unaware code within a single instruction set, without proliferation of the number of instructions required, and hence without placing significant constraints on the instruction encoding space. This is particularly beneficial with regards to the load and store instructions, since it may be the case that multiple different types of load and store instructions are already encoded within the instruction space, and there would be insufficient space to create further capability-aware versions of all of those load and store instructions. Instead, in accordance with the described embodiment, no such additional load and store instructions are required, and instead the behaviour of the existing load and store instructions can be modified dependent on the current instruction context, so as to implement both capability unaware versions and capability aware versions of the load and store instructions.

It is desirable to provide a mechanism for efficiently updating the current instruction context within the current instruction context register 72, so as to allow, for example, the apparatus to switch between executing capability aware code and capability unaware code, and vice versa. In one embodiment, to support such switching, one or more (in one embodiment all) of the capability registers 60 are provided with an additional field 68 providing a destination instruction context. In addition, certain branch instructions are defined which reference one of the capability registers 60, and which can be executed in both the capability state and the default state to access such a capability register. When performing the required branch operation, the contents of the accessed capability register 60 are used to update the PCC register 80, in order to identify a program counter pointer, along with associated range and restriction information, relevant to the first instruction to be executed in the target code. In addition, the value in the field 68 of the relevant capability register is used to update the contents of the current instruction context register 72, hence identifying the correct current instruction context for the target/destination code. This process is illustrated schematically in FIG. 5.

In particular, as used herein, the term capability branch instruction will refer to a branch instruction which references a capability register. Such a capability branch instruction is not within the second subset 105 of the instruction set, since its behaviour is not dependent on the current instruction context, and instead such a capability branch instruction can be viewed to be one of the new capability instructions 110 added to the instruction set.

At step 200, it is detected whether a capability branch instruction needs to be executed, and when it does the process proceeds to step 205, where it is determined whether the current capability branch instruction is a branch with link instruction. If it is, then the current instruction context, along with the current contents of the PCC register 80, are stored within a capability link register at step 210, the capability link register being one of the registers in the set 60 of capability registers. The capability link register hence identifies how the PCC register should be updated when in due course a return from the branch with link instruction is performed, and also identifies the appropriate current instruction context to be stored in the current instruction context register 72 following such a return to the original code being executed prior to the branch with link instructions.

If it is determined at step 205 that the branch instruction is not a branch with link instruction, i.e. it is merely a normal branch, then step 210 is not required and the process proceeds directly to step 215. It should be noted that a capability return instruction can be provided which is effectively a capability branch instruction without link, where the referenced capability register is the capability link register. Hence, a capability return instruction would follow the "no" branch from path 205 directly to step 215.

At step 215, the current contents of the PCC register 80 are overwritten with the contents of the capability register identified by the branch instruction. This hence identifies, via the new pointer stored in the PCC register 80, the first address of an instruction to be executed in the target code, along with appropriate range and restriction information to be used when fetching instructions of the target code.

At step 220, it is determined whether the destination instruction context in the capability register is set, in this example it being assumed that a "set" state indicates the capability state and an unset state indicates the default state. Accordingly, if the destination instruction context is set, then at step 225 the contents of the current instruction context register 72 are updated to identify the capability state. Conversely, if the destination instruction context is not set, the current instruction context register 72 is updated at step 230 to identify the default state. It should be noted that whilst in some instances the performance of step 225 or 230 will actually cause the current instruction context state to switch, in other instances the effect of the update operation may be that the current instruction context is unchanged (for example because the destination instruction context indicates the capability state but the current instruction context is already the capability state, or because the destination instruction context indicates the default state and the current instruction context is already the default state).

FIG. 6A illustrates an example sequence of code that implements the process of FIG. 5. In particular, as shown in FIG. 6A, it is assumed that the code is initially executing in the capability state, and that at address 8000 a branch with link instruction is executed that specifies the capability register C1. In this example, it is assumed that the pointer in C1 identifies the address 0x10000, namely the first address for the target code. It is also assumed that the destination instruction context specified in the capability register C1 is at a logic 1 value, which is assumed to correspond to the earlier mentioned unset state, and hence identifies the default state. Accordingly, when executing the branch with link instruction, the capability link register (which in this example is register C30) is updated with the next address after the branch with link instruction, namely address 0x8004, and also has its destination instruction context set to a logic 0 value, indicating the capability state. The PCC register 80 is then updated with the contents of the capability register C1, in order to identify the address 0x10000, along with associated range and restriction information. In addition, the current instruction context register 72 is updated with the value of "1" as stored within the capability register C1, thereby causing the state to transition to the default state.

FIG. 6B illustrates the contents of the capability register C1, it including a pointer 272, range information 274, restriction information 276, and the destination instruction context field 278. As mentioned above, it is assumed in this example that a logic 1 value within the destination instruction context field indicates the default state, whilst a logic 0 value indicates the capability state.

Returning to FIG. 6A, following the execution of the branch with link instruction, instructions are executed within the default state starting from address 10000. At some point, an RETC instruction is encountered, i.e. a capability return instruction, which as mentioned earlier can be considered to be a branch instruction that specifies as its capability register the capability link register C30. As will be apparent from a review of FIG. 5, when executing the RETC instruction, the "no" branch will be taken from step 205, and at step 215 the PCC register 80 will be updated with the contents of the capability link register, in order to identify the next address 8004. Also, during this process, the current instruction context register 72 will be updated to a logic 0 value, to identify the capability state, hence causing a transition back to the capability state whereafter instructions are executed starting from address 8004.

Whilst in the above example, it is assumed that the current instruction context is stored within the current instruction context register 72 forming one of the control registers 70, in another embodiment it would be possible for the current instruction context to actually be stored as a permission bit within the PCC 80. This permission bit value would then be used to influence the behaviour of any instructions in the second subset 105 of the instruction set that are fetched by the fetch unit 6 using those PCC register 80 contents. When executing a branch with link instruction, then the current contents of the PCC would be stored into the capability link register C30, and as a result the capability link register C30 would also capture the current instruction context for later use when returning to the original code in due course.

In the example discussed with reference to FIG. 5, it is assumed that a capability branch instruction is used to update the current instruction context register 72 during a branch operation. However, in an alternative embodiment a separate instruction can be used to update the current instruction context. A process performed in accordance with one such embodiment is shown in FIG. 7. In FIG. 7, the term "caller code" will be used to refer to the originally executing code prior to the branch, and the term "callee code" will be used to refer to the target code that is executed following the branch, and that is subsequently returned from. Further, it will be assumed that the transition sequence is a branch from the capability state into the default state, with a subsequent return from the default state back to the capability state.

Accordingly, the caller code is initially executing in the capability state, and at step 300 determines that a switch to the default state is required. In particular, it may be desired to branch to some capability unaware code to make use of some existing functionality in an existing software library. At step 305, one or more instructions are executed to explicitly change the current instruction context to the default state. As will be discussed later with reference to the example of FIG. 8, this may in one embodiment involve the execution of a move instruction applied in respect of the general purpose registers 40, followed by a further move instruction of a type that moves the contents from one of the general purpose registers into one of the system control registers 70, in particular in this example the Current Instruction Context (CIC) register 72. Alternatively, it may be possible merely to execute an instruction that loads an immediate value specified by that instruction into the CIC register 72.

Following execution of the required instructions at step 305, a branch instruction is then executed at step 310 to branch to the callee code. At step 315, the callee code is then executed in the default state, whereafter at some point a return instruction is executed by the callee code at step 320 to return to the caller code.

At this point, control has been returned to the caller code, but the current instruction context is still the default state. Accordingly, at step 325, the caller code executes one of more instructions to explicitly change the current instruction context to the capability state, whereafter at step 330 the caller code then continues execution in the capability state.

The process of FIG. 7 is illustrated schematically by way of example with reference to FIG. 8. Initially, it is assumed that the code is executing in capability state, and that a load instruction is executed at address 8000 to load into the general purpose register X1 the data found at the memory address identified by the pointer in the capability register C0. As will become apparent later, this data that is loaded into the general purpose register X1 is actually used as the address for the first instruction to be executed in the target code transferred to via a subsequent branch operation. Accordingly, execution of the load instruction in the capability state serves to set within one of the general purpose registers the target address for the first instruction of the callee code.

The address is then incremented to the address 8004, where a move instruction is executed to store within the general purpose register X2 the value "1". Thereafter, the next instruction is an MSR instruction that moves the contents of the general purpose register X2 into the current instruction context register 72. Accordingly, it will be seen that a logic 1 value is written into the CIC register 72, which as shown by the arrow 350 causes a transfer to the default state.

At this point, the caller code is still executing, but is now in the default state. Accordingly, the next instruction of the caller code executed is at address 800C, and is a branch with link instruction that uses the contents of the general purpose register X1 as its pointer. As discussed earlier, the contents of the register X1 now identify the start address for the callee code, which in this example is assumed to be address 10000. Accordingly, execution of the branch with link instruction causes a general purpose link register within the set 40 to be updated with the return address, which in this example will be address 8010 (i.e. identifying the next instruction of the caller code after the BLR instruction), whereafter the program counter will be updated with the address 10000. Accordingly, instructions thereafter begin executing at address 10000, in order to execute the required callee code. At some point within execution of the callee code, a return instruction will be executed, to return back to the caller code. At this point, the PC value will be updated with the address 8010, identifying the next instruction within the caller code.

It should be noted at this point that whilst execution has been returned back to the caller code, the current instruction context is still the default state. Hence, the first instructions executed by the caller code following the return are used to cause a transfer back to the capability state. In particular, a move instruction is executed to store a logic 0 value in the general purpose register X2, whereafter an MSR instruction is used to store that logic 0 value into the CIC register 72, thereby causing the transition back to the capability state, as indicated by the arrow 360 in FIG. 8.

When adopting the approach discussed with reference to FIGS. 7 and 8, there is no need for the capability registers 60 to be extended with a destination instruction context field 68. However, it does require the execution of specific additional instructions to update the current instruction context within the register 72. Irrespective of whether the approach of FIG. 5 is taken or the approach of FIG. 7 is taken, by including the current instruction context within the current instruction context register 72, it can be ensured that on occurrence of exceptions, the active current instruction context will naturally be saved in the relevant exception registers for restoring on return from the exception.

As mentioned when discussing FIG. 3, a certain number of new capability instructions 110 can be added to the instruction set to provide enhanced functionality, having regard to the fact that a second subset 105 of instructions exists whose behaviour is dependent on the current instruction context. One example of such a new capability instruction is the earlier mentioned capability branch instruction discussed with reference to FIG. 5. It would also be possible to provide one or more other instructions that reference pointers but whose behaviour is the same irrespective of whether the current instruction context is the default state or the capability state. One such example is shown in FIG. 9 for the instruction $LDR_{ALT}$, which is an alternative load instruction not included within the second subset 105. As will be apparent from a comparison of FIG. 9 with FIG. 4B, the $LDR_{ALT}$ instruction operates in exactly the same way as the load instruction of FIG. 4B would operate if the current instruction context was the capability state. However, unlike the LDR instruction described in FIG. 4B, the $LDR_{ALT}$ instruction also operates in exactly the same way when the current instruction context is the default state. Such an alternative load (or indeed an alternative store) instruction can be useful in a variety of situations, for example when seeking to wrap up existing default code in a thin wrapper that is capability aware whilst in the default state. This would hence allow the existing default code and associated wrapper to execute in the default state, but to make some use of capabilities in capability registers.

FIGS. 10A and 10B illustrate another type of additional instruction 110 that may be added to the instruction set, these instructions being referred to as opposite state behaviour instructions since they operate as if the current instruction context is in the opposite state to the actual indicated state in the current instruction context register 72. Hence, as will be apparent from a comparison of FIG. 10A with FIG. 4A, and a comparison of FIG. 10B with FIG. 4B, the specified $LDR_{OSB}$ (where OSB stands for Opposite State Behaviour) instruction is arranged to operate, when the current instruction context is in the capability state, in the same way as a load instruction in the second subset 105 of instructions would operate if the current instruction context were the default state. Similarly, as shown in FIG. 10B, the $LDR_{OSB}$ instruction is arranged to execute, when the current instruction context is the default state, in exactly the same way as a load instruction in the second subset 105 would operate if the current instruction context were the capability state. The use of such opposite state behaviour instructions can provide a useful enhancement, by permitting efficient interwork between capability aware and capability unaware code. For example, it may be desired that the capability unaware code passes a pointer reference back to the capability aware code, in situations where the capability aware code wants to use that pointer "as is" without converting it to a real capability within one of the capability registers. Instead, it is possible for that pointer to be processed in the capability state using the general DDC constraints to control its usage.

It will be appreciated from the above described embodiments that these embodiments provide an efficient mechanism for allowing a single instruction set to be used to write both capability aware and capability unaware code, without proliferation of the number of instructions in the instruction set, and hence providing significant benefits in situations where instruction encoding space severely limits the number of additional instructions that can be added to an instruction set. There are a number of emerging capability-based architectures where the above described techniques would allow the functionality of those capability-based architectures to be incorporated within an existing default instruction set, for example a default instruction set that was capability unaware. One particular example of such a capability-aware architecture is the CHERI architecture, more details of which can be found in Technical Report Number 850, UCAM-CL-TR-850, ISSN 1476-2986, entitled "Capability Hardware Enhanced RISC Instructions: CHERI Instruction-set architecture" by R Watson et al, University of Cambridge Computer Laboratory.

The techniques of the described embodiments enable software to efficiently implement fine-grained memory protection as supported by such capability-aware architectures, whilst allowing the same instruction set to also be used to write code that is not capability aware. In one embodiment, such capability unaware code can be arranged to use an implicit, default set of capabilities to control memory access, for example using the earlier mentioned DDC register contents. By the above described techniques, it is possible to permit efficient fine-grained interwork between capability aware and capability unaware code such that existing applications can be relinked with capability aware libraries, and new applications can be linked with older capability unaware libraries. The above approach supports existing load/store instructions unaltered for capability unaware code, whilst also supporting an equivalently rich set of load/store instructions for capability aware code, but without placing significant additional constraints on the instruction encoding space.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
a set of bounded pointer storage elements, each bounded pointer storage element to store a pointer having associated range information indicative of an allowable range of addresses when using said pointer;
a set of data registers to store data values;
processing circuitry to execute a sequence of instructions; and
a control storage element to store a current instruction context;
the processing circuitry being responsive to execution of at least one instruction in said sequence that specifies a pointer reference for a required pointer, where the pointer reference is within at least a first subset of values:
to use the pointer reference to identify one of the data registers whose stored data value forms the required pointer, when the current instruction context identifies a default state;
to use the pointer reference to identify one of the bounded pointer storage elements whose stored pointer forms the required pointer, when the current instruction context identifies a bounded pointer state;
to determine an address from the required pointer;
when the current instruction context identifies the bounded pointer state, to perform a bound check operation to check that the determined address is within the allowable range of addresses indicated by the associated range information for said one of the bounded pointer storage elements; and
when the current instruction context identifies the default state, to perform a default bound check operation to check that the determined address is within a default allowable range of addresses.

2. An apparatus as claimed in claim 1, further comprising a default range storage element to store range information indicative of said default allowable range.

3. An apparatus as claimed in claim 1, wherein when performing the bound check operation, the processing circuitry takes into account a size of data value being accessed at the determined address, in order to ensure that all of the data value is within the allowable range of addresses.

4. An apparatus as claimed in claim 1, wherein:
said processing circuitry is responsive to execution of at least one further instruction in said sequence to update the current instruction context stored in said control storage element.

5. An apparatus as claimed in claim 4, wherein:
at least one of the bounded pointer storage elements includes a destination instruction context field specifying an instruction context value;
said at least one further instruction is a branch instruction having, as a specified bounded pointer storage element, one of said at least one of the bounded pointer storage elements; and
the processing circuitry is responsive to executing said branch instruction to update the current instruction context by storing in the control storage element the instruction context value from the specified bounded pointer storage element.

6. An apparatus as claimed in claim 5, further comprising a bounded program counter storage element to store a program counter pointer having associated range information indicative of an allowable range of program counters determined from said program counter pointer, and the processing circuitry is additionally responsive to execution of said branch instruction to update the bounded program counter storage element using the pointer and associated range information of said specified bounded pointer storage element.

7. An apparatus as claimed in claim 5, wherein:
said branch instruction is executable by the processing circuitry in both said default state and said bounded pointer state to allow a switch between said default state and said bounded pointer state.

8. An apparatus as claimed in claim 7, wherein:
said set of bounded pointer storage elements includes a bounded link storage element whose pointer is used to identify a return address, the bounded link storage element further identifying a return instruction context;
said branch instruction specifies said bounded link storage element and is executed by the processing circuitry to return from an earlier branch and to update the current instruction context by storing in the control storage element the return instruction context identified in the bounded link storage element.

9. An apparatus as claimed in claim 4, wherein:
said at least one further instruction comprises an update instruction to write an update value specified by the update instruction into said control storage element in order to update the current instruction context.

10. An apparatus as claimed in claim 9, wherein the update instruction identifies one of said data registers whose stored data value is used to update the current instruction context.

11. An apparatus as claimed in claim 9, wherein the update instruction specifies an immediate value used to update the current instruction context.

12. An apparatus as claimed in claim 1, wherein said at least one instruction in said sequence that specifies a pointer reference for a required pointer is at least one of a load instruction and a store instruction.

13. An apparatus as claimed in claim 1, wherein said processing circuitry is arranged to execute instructions from an instruction set, said instruction set comprising a first subset of instructions whose execution behaviour is independent of said current instruction context, and a second subset of instructions whose execution behaviour is dependent on said current instruction context, said second subset comprising said at least one instruction in said sequence that specifies a pointer reference for a required pointer.

14. An apparatus as claimed in claim 13, wherein said instruction set includes at least one additional instruction that specifies a pointer reference for a required pointer, wherein when executing said at least one additional instruction, the processing circuitry is arranged to use the pointer reference to identify one of the bounded pointer storage elements whose stored pointer forms the required pointer, irrespective of whether the current instruction context identifies the bounded pointer state or the default state.

15. An apparatus as claimed in claim 13, wherein said instruction set includes at least one opposite state behaviour instruction that specifies a pointer reference for a required pointer, wherein when executing said at least one opposite state behaviour instruction, the processing circuitry is arranged
to use the pointer reference to identify one of the data registers whose stored data value forms the required pointer, when the current instruction context identifies the bounded pointer state;
to use the pointer reference to identify one of the bounded pointer storage elements whose stored pointer forms the required pointer, when the current instruction context identifies the default state.

16. An apparatus as claimed in claim 1, wherein said set of bounded pointer storage elements comprise a set of bounded pointer storage registers.

17. An apparatus as claimed in claim 1, wherein each bounded pointer storage element is configured to store the pointer and the associated range information.

18. An apparatus as claimed in claim 1, comprising a further storage element to store the associated range information for the pointer stored in a corresponding bounded pointer storage element.

19. An apparatus as claimed in claim 1, wherein the range information identifies a lower bound and an upper bound for the allowable range of addresses.

20. An apparatus as claimed in claim 1, wherein the range information identifies one of a lower bound and an upper bound for the allowable range of addresses, and a size of the allowable range of addresses.

21. An apparatus as claimed in claim 1, wherein the processing circuitry is responsive to execution of said at least one instruction in said sequence, irrespective of the value of the pointer reference:
to use the pointer reference to identify one of the data registers whose stored data value forms the required pointer, when the current instruction context identifies the default state;
to use the pointer reference to identify one of the bounded pointer storage elements whose stored pointer forms the required pointer, when the current instruction context identifies the bounded pointer state.

22. An apparatus as claimed in claim 1, wherein the processing circuitry is responsive to execution of said at least one instruction in said sequence, when the pointer reference is within a second subset of values different to said first subset, to use the pointer reference to identify one of the data registers whose stored data value forms the required pointer, irrespective of whether the current instruction context identifies the default state or the bounded pointer state.

23. An apparatus as claimed in claim 1, wherein:
said control storage element is arranged to store at least one further current instruction context; and
the processing circuitry is arranged to reference the current instruction context when the pointer reference specified by said at least one instruction is within said first subset of values, and to reference one of said at least one further current instruction contexts when the pointer reference specified by said at least one instruction is within at least one further subset of values;
such that the pointer reference is used to identify either a data register or a bounded pointer storage element dependent on the current instruction context applicable for the value of the pointer reference.

24. A method of controlling instruction execution behaviour within an apparatus having a set of bounded pointer storage elements, each bounded pointer storage element for storing a pointer having associated range information indicative of an allowable range of addresses when using said pointer, and having a set of data registers for storing data values, the method comprising:

storing within a control storage element a current instruction context;
on executing at least one instruction that specifies a pointer reference for a required pointer, where the pointer reference is within at least a first subset of values:
  using the pointer reference to identify one of the data registers whose stored data value forms the required pointer, when the current instruction context identifies a default state;
  using the pointer reference to identify one of the bounded pointer storage elements whose stored pointer forms the required pointer, when the current instruction context identifies a bounded pointer state;
  determining an address from the required pointer;
  when the current instruction context identifies the bounded pointer state, performing a bound check operation to check that the determined address is within the allowable range of addresses indicated by the associated range information for said one of the bounded pointer storage elements; and
  when the current instruction context identifies the default state, performing a default bound check operation to check that the determined address is within a default allowable range of addresses.

25. An apparatus, comprising:
a set of bounded pointer storage means, each bounded pointer storage means for storing a pointer having associated range information indicative of an allowable range of addresses when using said pointer;
a set of data register means for storing data values;
processing means for executing a sequence of instructions; and
a control storage means for storing a current instruction context;
the processing means, responsive to execution of at least one instruction in said sequence that specifies a pointer reference for a required pointer, where the pointer reference is within at least a first subset of values:
  for using the pointer reference to identify one of the data register means whose stored data value forms the required pointer, when the current instruction context identifies a default state;
  for using the pointer reference to identify one of the bounded pointer storage means whose stored pointer forms the required pointer, when the current instruction context identifies a bounded pointer state;
  for determining an address from the required pointer;
  when the current instruction context identifies the bounded pointer state, for performing a bound check operation to check that the determined address is within the allowable range of addresses indicated by the associated range information for said one of the bounded pointer storage means; and
  when the current instruction context identifies the default state, for performing a default bound check operation to check that the determined address is within a default allowable range of addresses.

* * * * *